US 12,418,364 B2

United States Patent
Hou et al.

(10) Patent No.: US 12,418,364 B2
(45) Date of Patent: Sep. 16, 2025

(54) ELECTRONIC DEVICE, WIRELESS COMMUNICATION METHOD, AND COMPUTER READABLE MEDIUM

(71) Applicant: Sony Group Corporation, Tokyo (JP)

(72) Inventors: Yanzhao Hou, Beijing (CN); Min Zhu, Beijing (CN); Lei Gao, Beijing (CN); Xin Guo, Beijing (CN); Chen Sun, Beijing (CN); Bing Wang, Beijing (CN); Xiaofeng Tao, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/672,082

(22) Filed: May 23, 2024

(65) Prior Publication Data

US 2024/0313892 A1    Sep. 19, 2024

Related U.S. Application Data

(63) Continuation of application No. 17/424,167, filed as application No. PCT/CN2020/074416 on Feb. 6, 2020, now Pat. No. 12,040,900.

(30) Foreign Application Priority Data

Feb. 13, 2019    (CN) .................. 201910112921.X

(51) Int. Cl.
*H04J 3/00* (2006.01)
*H04L 1/1607* (2023.01)
(Continued)

(52) U.S. Cl.
CPC .......... *H04L 1/1678* (2013.01); *H04L 1/1812* (2013.01); *H04W 72/20* (2023.01)

(58) Field of Classification Search
CPC .................. H04W 72/1278; H04W 72/12; H04L 1/1812; H04L 1/1678; H04L 1/16; H04L 1/18
(Continued)

(56) References Cited

U.S. PATENT DOCUMENTS 10,230,502 B2 *   3/2019   Ji .......................... H04L 1/1812
11,889,526 B2 *   1/2024   Chen ..................... H04L 5/0048
(Continued)

FOREIGN PATENT DOCUMENTS

CN     104754752 A    7/2015
CN     105991247 A    10/2016
(Continued)

OTHER PUBLICATIONS

International Search Report and Written Opinion mailed on Apr. 24, 2020, received for PCT Application PCT/CN2020/074416, Filed on Feb. 6, 2020, 8 pages including English Translation.
(Continued)

*Primary Examiner* — Marceau Milord
(74) *Attorney, Agent, or Firm* — XSENSUS LLP

(57) ABSTRACT

The present invention relates to an electronic device, a wireless communication method, and a computer readable medium. According to one embodiment, the electronic device used for wireless communication comprises a processing circuit. The processing circuit is configured to perform control to send data and information related to retransmission of the data to a target user equipment by means of a sidelink. The processing circuit is further configured to control operation for the retransmission of the data.

23 Claims, 13 Drawing Sheets

(51) Int. Cl.
*H04L 1/1812* (2023.01)
*H04W 72/20* (2023.01)

(58) Field of Classification Search
USPC .................................................. 370/329, 336
See application file for complete search history.

(56) References Cited

U.S. PATENT DOCUMENTS

| | | | |
|---|---|---|---|
| 11,997,516 B2* | 5/2024 | Qu | H04W 72/0446 |
| 12,040,900 B2* | 7/2024 | Hou | H04L 5/0053 |
| 2017/0325216 A1* | 11/2017 | Nogami | H04L 5/0055 |
| 2018/0019844 A1* | 1/2018 | Nogami | H04L 5/0055 |
| 2018/0020335 A1* | 1/2018 | Yin | H04W 28/0268 |
| 2018/0042015 A1* | 2/2018 | Yin | H04W 72/23 |
| 2018/0044205 A1* | 2/2018 | Kawakatsu | B01D 61/16 |
| 2018/0278382 A1 | 9/2018 | Ji et al. | |
| 2019/0082334 A1* | 3/2019 | Nagaraja | H04W 72/0453 |
| 2019/0182859 A1 | 6/2019 | Khoryaev et al. | |
| 2019/0297642 A1 | 9/2019 | Sun et al. | |
| 2020/0154404 A1* | 5/2020 | Göktepe | H04L 1/1812 |
| 2020/0404625 A1* | 12/2020 | Roth-Mandutz | H04W 4/70 |

FOREIGN PATENT DOCUMENTS

| | | |
|---|---|---|
| CN | 106160951 A | 11/2016 |
| CN | 108668371 A | 10/2018 |
| CN | 108809507 A | 11/2018 |
| CN | 108809577 A | 11/2018 |
| CN | 108923894 A | 11/2018 |
| CN | 109041248 A | 12/2018 |
| CN | 109156013 A | 1/2019 |
| CN | 109217988 A | 1/2019 |
| CN | 109314615 A | 2/2019 |
| EP | 3876452 A1 | 9/2021 |
| WO | 2016/131344 A1 | 8/2016 |
| WO | 2018/123950 A1 | 7/2018 |
| WO | 2018/201005 A1 | 11/2018 |
| WO | 2019/012041 A1 | 1/2019 |

OTHER PUBLICATIONS

Asustek, "Discussion on Supporting HARQ Combining", 3GPP TSG RAN WG1 Meeting #94bis, R1-1811163, Oct. 8-12, 2018, 3 pages.

LG Electronics Inc., "eV2X Clean-Up Except for UL and SL Priotirization in TS 36.321", 3GPP TSG-RAN WG2 #104, R2-1818717, Nov. 12-16, 2018, 10 pages.

Fraunhofer HHI et al., "Sidelink Design for Unicast and Groupcast", 3GPP TSG RAN WG1 Meeting #94bis, R1-1810483, Oct. 8-12, 2018, total 6 pages, Chengdu, China.

Convida Wireless, Discussion on Unicast, Groupcast and Broadcast for NR V2X', 3GPP TSG-RAN WG1 Ad-Hoc Meeting 1901, R1-1901209, Jan. 21-25, 2019, total 3 pages, Taipei, Taiwan.

Samsung, On Physical Layer Procedures for NR V2X', 3GPP TSG RAN WG1 Ad-Hoc Meeting 1901, R1-1901048, Jan. 21-25, 2019, total 11 pages, Taipei, Taiwan.

3GPP, "14 UE procedures related to Sidelink", 3GPP TS 36.213, V14.0.0, Sep. 2016, total 22 pages.

* cited by examiner

ELECTRONIC DEVICE, WIRELESS COMMUNICATION METHOD, AND COMPUTER READABLE MEDIUM

CROSS-REFERENCE TO RELATED APPLICATIONS

The present application is a continuation of U.S. application Ser. No. 17/424,167, filed on Jul. 20, 2021, which is based on PCT filing PCT/CN2020/074416, filed on Feb. 6, 2020, which claims the priority to Chinese Patent Application No. 201910112921.X, titled "ELECTRONIC DEVICE, WIRELESS COMMUNICATION METHOD, AND COMPUTER READABLE MEDIUM", filed on Feb. 13, 2019 with the China National Intellectual Property Administration (CNIPA), each of which is incorporated herein by reference in its entirety.

FIELD

The present disclosure generally relates to the field of wireless communication, and in particular to an electronic device for wireless communication, a wireless communication method, and a computer readable medium.

BACKGROUND

In TS 36.213 of 3GPP (Third Generation Partnership Project), user equipment (UE) procedures in LTE (Long Term Evolution) V2X (Vehicle-to-everything) communication are defined for determining time-frequency resources for UE to transmit PSCCH (Physical Sidelink Control Channel) and corresponding PSSCH (Physical Sidelink Shared Channel) and receiving the PSCCH, and information domain and configuration method of SCI (sidelink control information) are further defined. TS 36.321 defines a retransmission-based sidelink HARQ (Hybrid Automatic Repeat Request) process at the MAC (Media Access Control) layer in LTE V2X. TS 36.300 defines multi-link transmission in LTE V2X.

SUMMARY

In the following, an overview of the embodiments of the present disclosure is given simply to provide basic understanding to some aspects of the present disclosure. It should be understood that, the summary is not an exhaustive summary of the present disclosure. It is neither intended to determine a critical part or an important part of the present disclosure, nor to limit the scope of the present disclosure. The purpose is only to provide some concepts in a simplified form, as a preamble of a detailed description later.

According to an embodiment, an electronic device for wireless communication is provided. The electronic device includes processing circuitry. The processing circuitry is configured to perform control to transmit data and information on retransmission of the data to target user equipment via a sidelink. The processing circuitry is further configured to control an operation for retransmission of the data.

According to an embodiment, a wireless communication method includes a step of transmitting data and information on retransmission of the data to target user equipment via a sidelink. The method further includes a step of performing an operation for retransmission of the data.

According to an embodiment, an electronic device for wireless communication is provided. The electronic device includes processing circuitry. The processing circuitry is configured to perform control to receive data and information on retransmission of the data from source user equipment via a sidelink. The processing circuitry is further configured to control an operation for retransmission of the data.

According to an embodiment, a wireless communication method includes a step of receiving data and information on retransmission of the data from source user equipment via a sidelink. The method further includes a step of performing an operation for retransmission of the data.

According to an embodiment, an electronic device for wireless communication is provided. The electronic device includes processing circuitry. The processing circuitry is configured to set sidelink control information for indicating information on data retransmission performed from source user equipment to target user equipment via a sidelink. The processing circuitry is further configured perform control to notify the set sidelink control information to the source user equipment. The information on data retransmission includes a time gap between initial transmission and retransmission of the data by the source user equipment, or time domain position information of a feedback to the data by the target user equipment.

According to an embodiment, a wireless communication method includes a step of setting sidelink control information. The sidelink control information is for indicating information on data retransmission performed from source user equipment to target user equipment via a sidelink. The method further includes a step of notifying the set sidelink control information to the source user equipment. The information on data retransmission includes a time gap between initial transmission and retransmission of the data by the source user equipment, or time domain position information of a feedback to the data by the target user equipment.

According to another embodiment, a computer-readable medium including executable instructions is provided. When executed by an information processing device, the executable instructions cause the information processing device to implement the above method.

With the embodiments of the present disclosure, data feedback and/or data retransmission in sidelink communication may be effectively performed, thereby ensuring reliability of the sidelink communication.

BRIEF DESCRIPTION OF THE DRAWINGS

The present disclosure may be understood better with reference to the description given in conjunction with drawings hereinafter. The same or similar reference numerals are used to indicate the same or similar components throughout the drawings. The drawings together with the following detailed description are included in the specification and form a part of the specification, so as to illustrate preferred embodiments of the present disclosure by examples and explain principles and advantages of the present disclosure. In the drawings.

DETAILED DESCRIPTION

Figure 1:
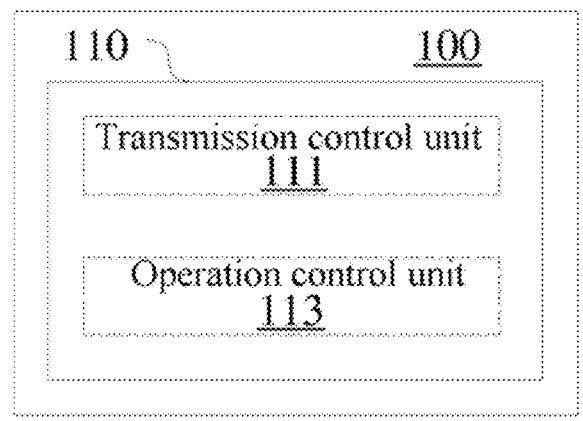
FIG. 1 is a block diagram showing a configuration example of an electronic device for wireless communication according to an embodiment of the present disclosure.

Embodiments of the present disclosure are described below with reference to the drawings. Elements and features described in one of the drawings or one of the embodiments of the present disclosure may be combined with elements and features described in one or more other drawings or embodiments. It should be noted that representations and descriptions of components and processing which are irrelevant to the present disclosure or known by those skilled in the art are omitted in the drawings and the description for clarity.

An exemplary configuration of an electronic device for wireless communication according to an embodiment of the present disclosure is described below with reference to FIG. 1. As shown in FIG. 1, an electronic device 100 for wireless communication according to the embodiment includes processing circuitry 110. The processing circuitry 110 may be implemented as, for example, a chip, a chipset, a central processing unit (CPU), or the like.

The electronic device according to the embodiment may be implemented on a user equipment side. More specifically, the user equipment may include a vehicle, for example. However, the present invention is not limited thereto, but may be used in various application scenarios of the New Wireless (NR) Sidelink, such as Machine-Type Communication (MTC), Device-to-Device (D2D) communication, Vehicle-to-everything (V2X) communication, Internet of Things (IOT) communication, drone communication, and the like. The V2X communication may include vehicle-to-vehicle (V2V) communication, vehicle-to-pedestrian (V2P) communication, vehicle-to-infrastructure (V2I) communication, and the like.

As shown in FIG. 1, the processing circuitry 110 includes a transmission control unit 111 and an operation control unit 113. It should be noted that, although the transmission control unit 111 and the operation control unit 113 are shown in a form of functional blocks in the drawings, it should be understood that functions of these units may also be implemented by the processing circuitry as a whole, and are unnecessarily implemented by discrete actual components in the processing circuitry. In addition, although the processing circuitry is shown as one block in the drawings, the electronic device may include multiple processing circuitry. The functions of these units may be distributed to the multiple processing circuitry, so that the multiple processing circuitry cooperate to perform these functions.

The transmission control unit 111 is configured to perform control to transmit data and information on retransmission of the data to target user equipment via a sidelink.

That is, the electronic device according to the embodiment may be implemented on a side of source user equipment (that is, the user equipment that operates as a transmission source of the transmitted data, and may also be referred to as a transmitting user in the present disclosure), and it may transmit the data to a side of target user equipment (that is, the user equipment that operates as a transmission target of the transmitted data, and may also be referred to as a receiving user in the present disclosure).

The source user equipment may, for example, transmit information on retransmission of the data as sidelink control information (SCI) to the target user equipment.

The operation control unit 113 is configured to control an operation for retransmission of the data.

As an example, the operation for retransmission of the data may include an operation of a retransmission-based sidelink hybrid automatic repeat request (SL HARQ) or an operation of a feedback-based SL HARQ. The retransmission-based SL HARQ refers to a method in which the transmitting user performs multiple retransmissions to ensure reliability of communication. The feedback-based SL HARQ is a method in which the receiving user feeds back acknowledgment (ACK) information or non-acknowledgement (NACK) information to the transmitting user via a physical sidelink feedback channel (PSFCH), for example, to determine whether the transmitting user needs retransmission to ensure the reliability of communication.

Corresponding to the retransmission-based SL HARQ, according to an embodiment, the information on retransmission of data may include a time gap between initial transmission of the data and retransmission of the data. Correspondingly, the operation for retransmission of the data may include performing retransmission of the data based on the time gap.

Figure 13:
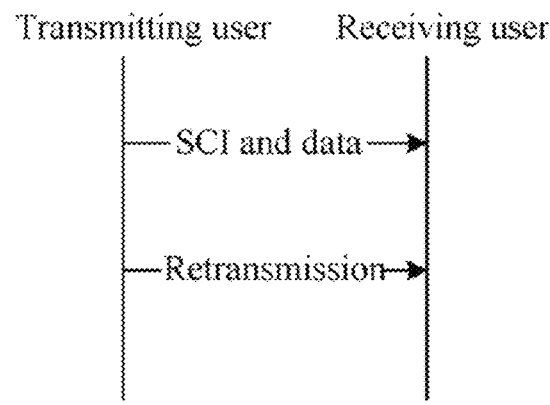
FIG. 13 is a flowchart showing an example of a retransmission-based sidelink data transmission.

FIG. 13 shows an exemplary method for the retransmission-based SL HARQ. As shown in FIG. 13, a transmitting user transmits SCI and data to a receiving user, and performs retransmission of the data after a time gap between initial transmission and retransmission.

In addition to the time gap between initial transmission and retransmission, the SCI may further include one or more of the following information: service priority, resource reservation, source ID information, destination ID information, frequency domain position(s) for initial transmission and retransmission, modulation and coding scheme(s), retransmission index, and the like.

Regarding a field of the frequency domain position(s) for initial transmission and retransmission in the SCI, a Mode 1 (a mode involving base station assistance) user may configure content of the field based on a base station instruction, and a Mode 2 (a mode involving no base station assistance) user may configure content of the field based on a high-level instruction.

Similarly, regarding to a field of the time gap between initial transmission and retransmission in the SCI, the Mode 1 user may configure content of the field based on a base station instruction, and the Mode 2 user may configure content of the field based on a high-level instruction. In particular, for example, in a case where the field of the time gap between initial transmission and retransmission is configured as 0, the user may transmit a service without retransmission.

Corresponding to the feedback-based SL HARQ, according to another embodiment, the information on retransmission of the data may include time domain position information for feedback of the target user equipment to the data. Correspondingly, the operation for retransmission of the data may include receiving feedback information of the target user equipment to the data based on the time domain position information, and performing retransmission of the data based on the feedback information.

Figure 14:
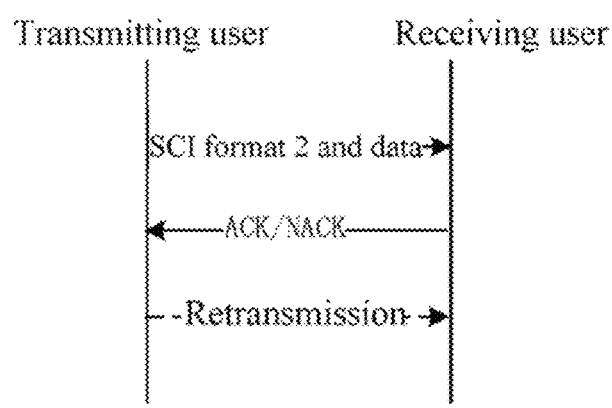
FIG. 14 is a flowchart showing an example of a feedback-based sidelink data transmission.

FIG. 14 shows an exemplary method for the feedback-based SL HARQ. As shown in FIG. 14, if the receiving user receives and successfully decodes a relevant transmission block (TB), the receiving user feeds back ACK information to the transmitting user. If the receiving user fails to decode the relevant transmission block after receiving it, the receiving user feeds back NACK information to the transmitting user, and the transmitting user perform retransmission after receiving the NACK feedback.

Although feedback and retransmission are performed in units of transmission blocks in this example, the present disclosure is not limited thereto. For example, the feedback and receiving may be performed in units of code block groups (CBG).

Figure 15:
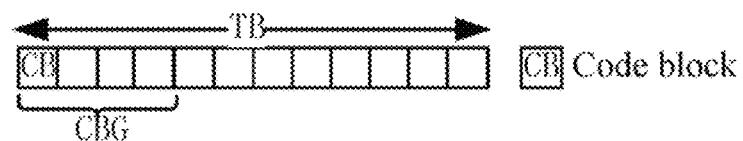
FIG. 15 is a schematic diagram showing a sidelink data transmission based on code block groups.

FIG. 15 is a schematic diagram showing a sidelink data transmission based on code block groups. As shown in FIG. 15, a TB contains multiple code blocks (CB), and several code blocks may form a code block group.

According to an embodiment, the information on retransmission of data may further include information indicating a retransmission unit (transmission block or code block group), and the operation for retransmission of data may include receiving a feedback to the data and performing retransmission of the data in units of transmission block or code block group.

More specifically, in a case of receiving feedback to the data and performing retransmission of the data in units of code block group, the receiving user may generate 1-bit ACK information for a CBG if it receives and successfully decodes codeword in the CBG; and the receiving user may generate 1-bit NACK information for a CBG if it fails to receive and decode the codeword in the CBG.

If each TB contains N code block groups, the codebook may include N-bits ACK/NACK information. The receiving user feeds back the information of the codebook to the transmitting user.

Correspondingly, the SCI may include, for example, service priority, resource reservation, source ID information, destination ID information, frequency domain position(s) for initial transmission and retransmission, time domain position(s) for initial transmission and retransmission, modulation and coding scheme(s), retransmission index, HARQ ID, CBG transmission information, and the like.

The CBG transmission information may be used to indicate the unit (TB or CBG) for the receiving user to perform SL HARQ feedback. For example, if a CBG field is empty, it indicates a non-CBG SL HARQ, and if the CBG field is not empty, it indicates a CBG SL HARQ.

In addition, in unicast communication and multicast communication, if the communicating users all support the feedback-based SL HARQ, the receiving user feeds back ACK/NACK information to the transmitting user via the physical sidelink feedback channel (PSFCH). Regarding resource configuration of the PSFCH, the SCI sent from the transmitting user to the receiving user may include a frequency domain position of a feedback transmission and a time domain position of the feedback transmission.

According to an embodiment, the time domain position information may include one or more time domain positions for receiving feedback information. In addition, the time domain position information may include one or more time windows for receiving feedback information.

Next, an exemplary manner in which the transmitting user configures PSFCH resources for the receiving user in the non-CBG SL HARQ is explained. The transmitting user indicates a time-frequency resource for sidelink feedback information to be used by the receiving user to feed back ACK/NACK information.

Figure 16:
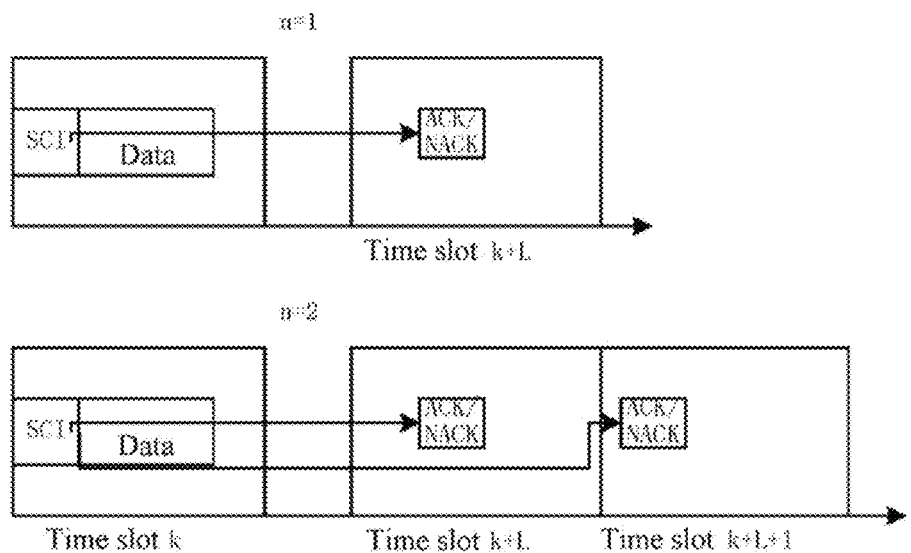
FIG. 16 is a schematic diagram illustrating an example of a time-frequency resource of sidelink feedback information.

As shown in FIG. 16, according to an exemplary embodiment, in the SCI, the transmitting user indicates n (n is greater than or equal to 1) time domain and frequency domain positions for the sidelink feedback information.

Figure 17:
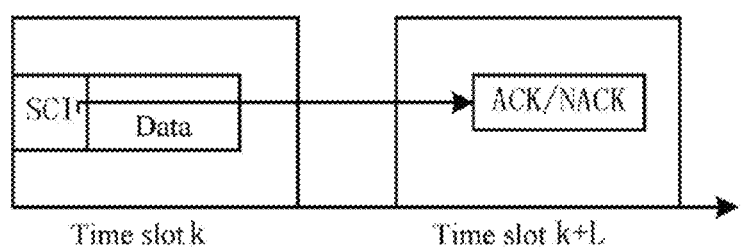
FIG. 17 is a schematic diagram illustrating another example of a time-frequency resource of sidelink feedback information.

As shown in FIG. 17, according to another exemplary embodiment, in the SCI, the transmitting user indicates a frequency domain position and a feedback time window for the sidelink feedback information.

Figure 18:
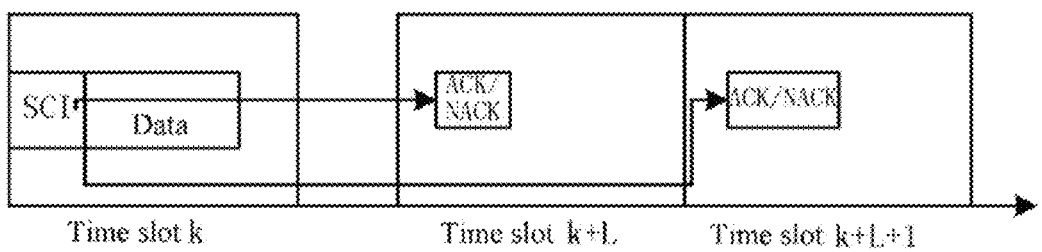
FIG. 18 is a schematic diagram illustrating another example of a time-frequency resource of sidelink feedback information.

As shown in FIG. 18, according to yet another exemplary embodiment, in the SCI, the transmitting user indicates a time-frequency position and a feedback time window for the sidelink feedback information.

In addition, for the CBG SL HARQ, the transmitting user may configure PSFCH resources for the receiving user in a similar way. The difference is that the time-frequency resource indicated by the transmitting user for the sidelink feedback information may be used for feedback codebook information.

After receiving the SCI information and decoding based on indications in the SCI field, the receiving user may determine a SL HARQ feedback resource. The transmitting user waits to receive the SL HARQ feedback information at the PSFCH resource position configured for the receiving user.

Next, exemplary methods for SL HARQ feedback are explained respectively corresponding to the foregoing feedback resource configurations.

According to an embodiment, the time domain position information for data retransmission may include multiple time domain positions for receiving feedback information, and the operation for retransmission of the data may include: receiving the feedback information successively at the multiple time domain positions until the feedback information is received; and performing retransmission if the feedback information is not received at any of the multiple time domain positions.

Figure 19:
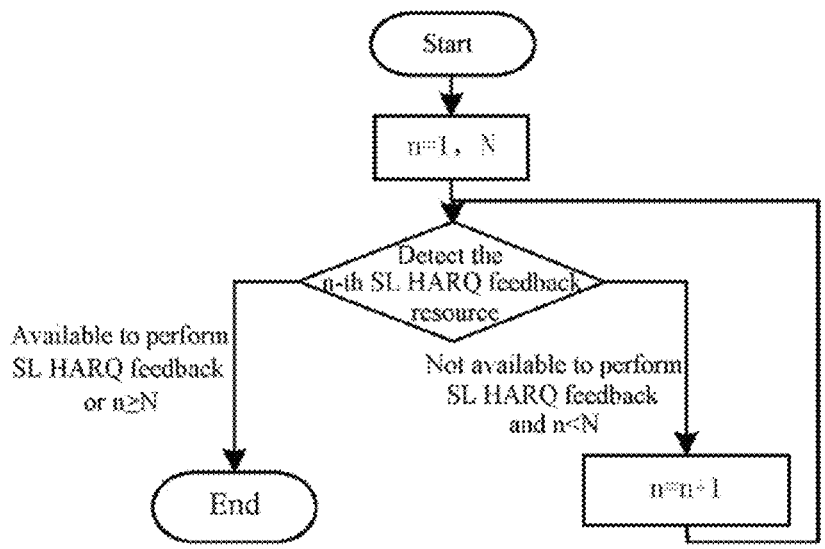
FIG. 19 is a flowchart illustrating an example of feedback processing on a receiving user side.

FIG. 19 shows an exemplary process, where N represents the number of resources configured for the SL HARQ feedback information, and the SL HARQ feedback resources are referred to, in chronological order, as a first SL HARQ resource, a second SL HARQ resource, and the like.

If the receiving user determines through detection that the first SL HARQ feedback resource configured by the transmitting user is not occupied and the time domain position thereof is available for transmission, the receiving user transmits the SL HARQ feedback information over the first SL HARQ feedback resource. Otherwise, the receiving user continues to detect the next feedback resource.

If none of the N feedback resources indicated by the transmitting user is available to perform SL HARQ feedback, the receiving user does not provide feedback to this transmission.

Correspondingly, in a case where the transmitting user receives the SL HARQ feedback information at the first SL HARQ resource position, the transmission is finished if the transmitting user receives ACK information, and retransmission is performed if the transmitting user receives NACK information.

If the transmitting user fails to receive the SL HARQ feedback information at the first SL HARQ resource position, the transmitting user continues to wait to receive the SL HARQ feedback at the next SL HARQ resource position. If the SL HARQ is received, the feedback is received successfully; otherwise, the steps are performed until the feedback information is received at one of the positions of the SL HARQ feedback resources.

If the transmitting user fails to receive the SL HARQ feedback at any of the positions of PSFCH resources configured for the receiving user, the retransmission is performed.

According to another embodiment, the time domain position information for data retransmission may include multiple time windows for receiving feedback information, and the operation for retransmission of the data may include: receiving the feedback information successively within the multiple time windows until the feedback information is received; and performing retransmission if the feedback information is not received within any of the multiple time windows.

More specifically, for example, the receiving user detects, within the feedback time window configured by the transmitting user, a time-frequency resource that is available to perform the SL HARQ feedback, and selects a time domain resource for the SL HARQ feedback based on a time delay requirement by a service, and performs the SL HARQ feedback. If no time-frequency resource that is available to perform the SL HARQ feedback is detected, the receiving user does not provide feedback to this transmission.

Correspondingly, the transmitting user waits to receive, within the time window of the PSFCH configured for the receiving user, the SL HARQ feedback. If the transmitting user receives the SL HARQ feedback information, the feedback is received successfully. If the transmitting user fails to receive the SL HARQ feedback at a resource part within the PSFCH time window, the retransmission step is performed.

According to another embodiment, the time domain position information for data retransmission includes a time domain position and a time window for receiving feedback information, and the operation for data retransmission may include: receiving the feedback information successively at the time domain position and within the time window, until the feedback information is received; and performing retransmission if failing to receive the feedback information at the time domain position or within the time window.

More specifically, if the receiving user detects that the first SL HARQ feedback resource configured by the transmitting user is not occupied and the time domain position thereof is available for transmission, the receiving user transmits the SL HARQ feedback information over the first SL HARQ feedback resource.

If the receiving user detects that the first SL HARQ feedback resource configured by the transmitting user is occupied or the time domain position thereof is not available for transmission, and an SL HARQ feedback time window is indicated by the transmitting user, the receiving user continues to detect the resources within the SL HARQ feedback time window, selects the time domain resource for the SL HARQ feedback based on a time delay requirement by a service, and performs the SL HARQ feedback.

If no resource is available for the SL HARQ feedback, the receiving user does not provide feedback to this transmission.

Correspondingly, in a case where the transmitting user receives the SL HARQ feedback information at the first SL HARQ resource position, the transmission is finished if the transmitting user receives ACK information, and retransmission is performed if the transmitting user receives NACK information.

If the transmitting user fails to receive the SL HARQ feedback information at the first SL HARQ resource position, the transmitting user continues to wait to receive, within the SL HARQ resource time window, the SL HARQ feedback. If the transmitting user receives the SL HARQ, the feedback is received successfully; otherwise, the transmitting user performs retransmission.

Processes for feedback and retransmission are described in conjunction with specific examples. In addition, in a case where the transmitting user 1 and the transmitting user 2 select transmitting resources through resource sensing, and communicate with receiving user 3 via link 1 and link 2, respectively, PSFCH resources determined for the receiving user 3 by the transmitting user 1 and transmitting user 2 may overlap in whole or in part. An exemplary embodiment for a situation of feedback resource collision is explained bellow.

Figure 22:
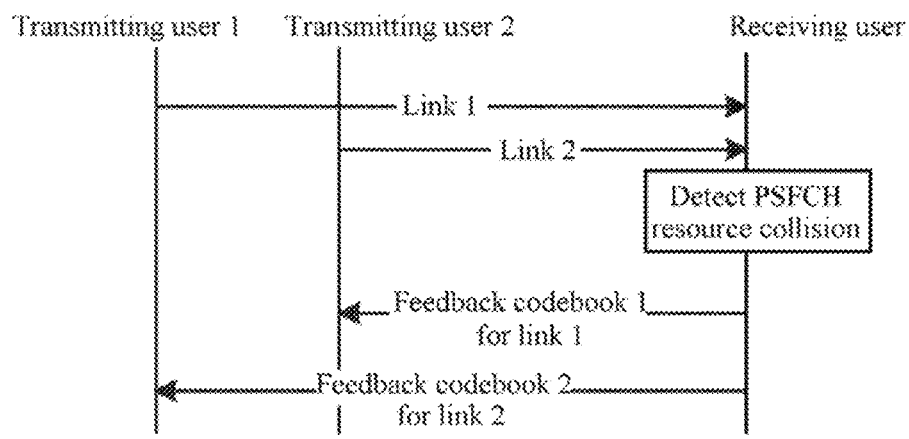
FIG. 22 is a flowchart illustrating yet another example of feedback processing in a case of multiple transmitting users.

Referring to FIG. 22, when the receiving user detects that the PSFCH resources of link 1 and link 2 collide, the receiving user process the SL HARQ feedback information of link 1 and the SL HARQ feedback information of link 2 and transmit the processed SL HARQ feedback information to the transmitting user 1 and the transmitting user 2, respectively.

The transmitting user may detect a signal on the PSFCH resource, and decode and receive the feedback signal using information on the transmitting user side. The transmitting user can only decode the feedback information on the link where the transmitting user is located. Therefore, the problem of feedback resource collision may be solved.

Correspondingly, according to an embodiment, the operation for data retransmission on the transmitting user side may include decoding the received feedback information, and determining whether the decoded feedback information is for the data transmitted from the transmitting user.

More specifically, the processing of the SL HARQ feedback information may include transmitting the user's ID or HARQ ID through respective links. Alternatively, the processing may include scrambling by codebook or the like.

Correspondingly, according to an embodiment, the operation for data retransmission on the transmitting user side may include performing feedback to the data and retransmission of the data in units of code block group, and the feedback information may include codebook information.

In addition, for a case where the receiving user receives data through multiple links, the maximum number M of links for feedbacks supported on a same resource may be set in consideration of power limitation for the user. The data may be configured through system information or RRC (Radio Resource Control) signaling, selected based on position, or pre-configured, for example.

Assuming that the receiving user detects that a PSFCH collision occurs for m (m>1) links: if M≥m, for each of the links, the scheme in the foregoing embodiment for feedback is adopted. If M<m, for example, priorities of the links are compared, and feedback is performed for M links with the highest priority over this PSFCH resource, and for the remaining links, feedback may be performed over other feedback resources thereof, or no feedback may be performed if there is no additional feedback resources.

Exemplary manners for retransmission of data based on feedback are explained below.

For non-CBG SL HARQ, after receiving the NACK information fed back by the receiving user, the transmitting user may perform retransmission of relevant transmission block (TB) with respect to this HARQ. For CBG SL HARQ, after receiving the codebook information fed back by the receiving user, the transmitting user may perform retransmission of CBG whose feedback is NACK in the codebook.

The transmitting user may perform retransmission of the data through a same resource or a different resource from that for the initial transmission of the data. In addition, the transmitting user may determine the resource for data retransmission according to the feedback information from the receiving user.

For example, the receiving user may transmit the retransmission feedback information while transmitting the SL HARQ feedback information including the NACK information, so as to assist the transmitting user in selecting resources for SL HARQ retransmission. The retransmission feedback information may include, for example, a set of retransmission resource candidates, a measurement result of (part or all) resource sensing performed by the receiving user, channel busy ratio (CBR) measurement information, channel state information (CSI), and the like.

Correspondingly, according to an embodiment, the feedback information from the receiving user may include information on a retransmission resource for the data, and the operation for the retransmission of the data may include determining the retransmission resource for the data according to the information on retransmission resource.

In a case where the transmitting user is a Mode 1 user, based on a resource measurement report from the transmitting user and the retransmission feedback information from the receiving user, a base station may configure retransmission resource for the transmitting user according to a resource pool situation and the resource report. In a case where the transmitting user is a Mode 2 user, the transmitting user may select the retransmission resource based on the resource measurement report and the retransmission feedback information from the receiving user.

In addition, in data retransmission, for example, information such as retransmission index and HARQ ID may be set in the SCI in order to distinguish between initial transmission and retransmission.

Figure 23:
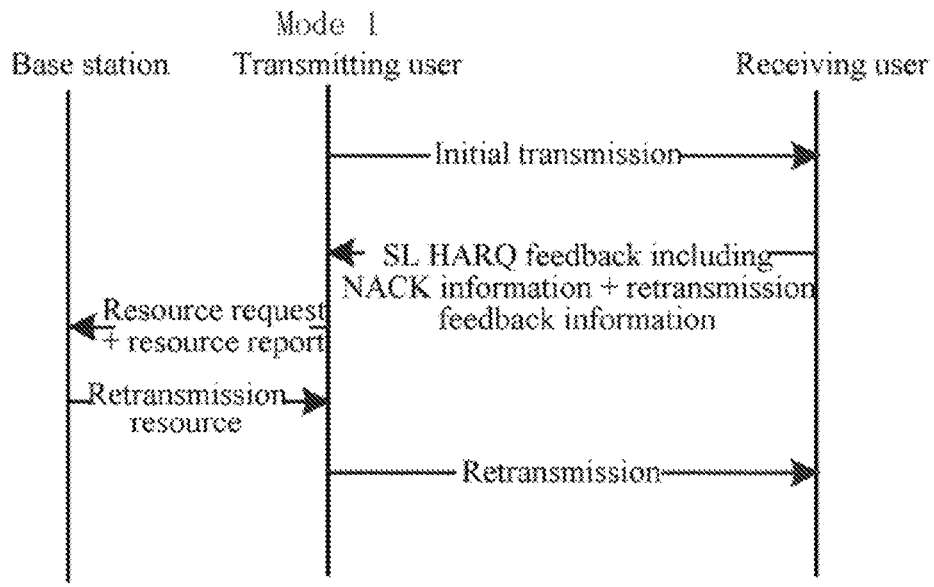
FIG. 23 is a flowchart illustrating an example of a process related to retransmission resource configuration.

FIG. 23 shows an exemplary process of a Mode 1 transmitting user obtains a retransmission resource according to base station configuration and resource report information.

First, the transmitting user receives and decodes SL HARQ feedback information and retransmission feedback information from the receiving user. The Mode 1 user then transmits a resource request and a resource report to the base station after receiving NACK information. The base station allocates a retransmission resource according to the retransmission request from the Mode 1 user, and notifies the same to the transmitting user. The Mode 1 user perform retransmission over the retransmission resource.

Figure 24:
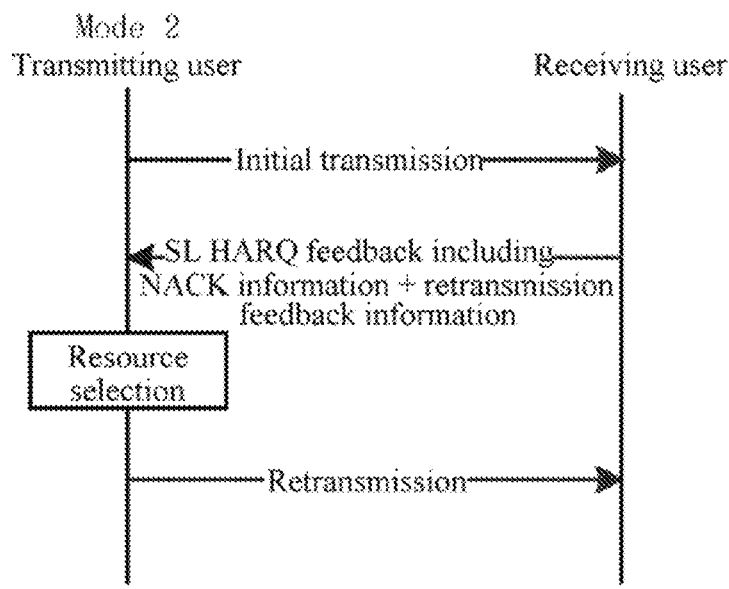
FIG. 24 is a flowchart illustrating an example of a process related to retransmission resource selection.

FIG. 24 shows an exemplary process of a Mode 2 transmitting user selecting a retransmission resource.

First, the transmitting user receives and decodes SL HARQ feedback information and retransmission feedback information from the receiving user. The Mode 2 user then selects a suitable retransmission resource according to the retransmission feedback request and the resource measurement result, and performs retransmission over the retransmission resource.

In the above description of the electronic device according to the embodiments of the present disclosure, some processes and methods are disclosed. Next, a wireless communication method according to an embodiment of the present disclosure is described without repeating the details described above.

Figure 2:
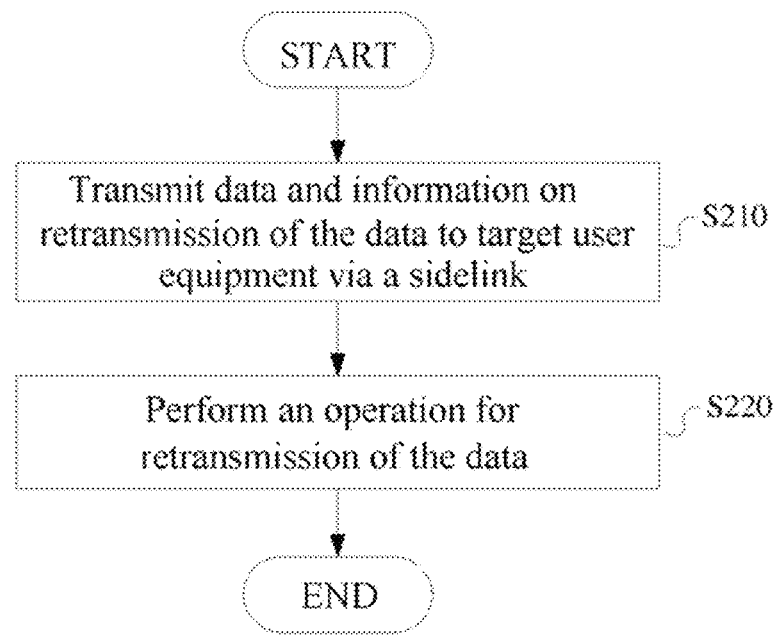
FIG. 2 is a flowchart showing a process example of a wireless communication method according to an embodiment of the present disclosure.

As shown in FIG. 2, the wireless communication method according to the embodiment includes a step S210 of transmitting data and information on retransmission of the data to target user equipment via a sidelink, and a step S220 of performing an operation for retransmission of the data.

This method may be implemented on the transmitting user side described above.

In addition, a device and a method implemented for a receiving user side are further provided in the present disclosure. Next, a description of the embodiment for the device and the method implemented for a receiving user side is given without repeating the details corresponding to the above description of that for the transmitting user side.

Figure 3:
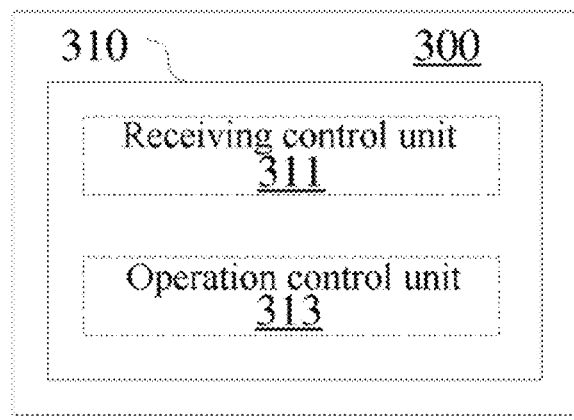
FIG. 3 is a block diagram showing a configuration example of an electronic device for wireless communication according to another embodiment of the present disclosure.

As shown in FIG. 3, an electronic device 300 for wireless communication according to the embodiment includes processing circuitry 310. The processing circuitry 310 includes a receiving control unit 311 and an operation control unit 313.

The electronic device according to the embodiment may be implemented on a user equipment side such as a vehicle, and may be applied to the aforementioned application scenarios of the sidelink.

The receiving control unit 311 is configured to perform control to receive data and information on retransmission of the data from source user equipment via a sidelink.

The operation control unit 313 is configured to control an operation for retransmission of the data.

According to an embodiment, the information on retransmission of the data may include a time gap between initial transmission and retransmission of the data, and the operation for the retransmission of the data may include receiving the retransmission of the data according to the time gap.

According to another embodiment, the information on retransmission of the data may include a time domain position information of a feedback to the data, and the operation for the retransmission of the data may include transmitting feedback information to the data to source user equipment based on the time domain position information.

The information on retransmission of the data may further include information indicating a retransmission unit, and the operation for the retransmission of the data may include performing a feedback to the data in units of transmission block or code block group.

The time domain position information may include one or more time domain positions for transmitting the feedback information and/or one or more time windows for transmitting the feedback information. The feedback information may be transmitted at one of the one or more time domain positions or within one of the one or more time windows.

According to an embodiment, the information on retransmission of the data may include a service priority of the data, and the operation for the retransmission of the data may include transmitting the feedback information and receiving other data based on the service priority, or may include transmitting the feedback information for multiple links.

More specifically, in a case where the number of the multiple links exceeds a predetermined threshold, the link for which the feedback information is to be transmitted may be selected according to the priority.

In addition, in a case where the receiving user detects that the SL HARQ feedback resource for the first link is restricted due to half-duplex because the second link is receiving information, the feedback of each link may also be performed according to the priority.

Figure 20:
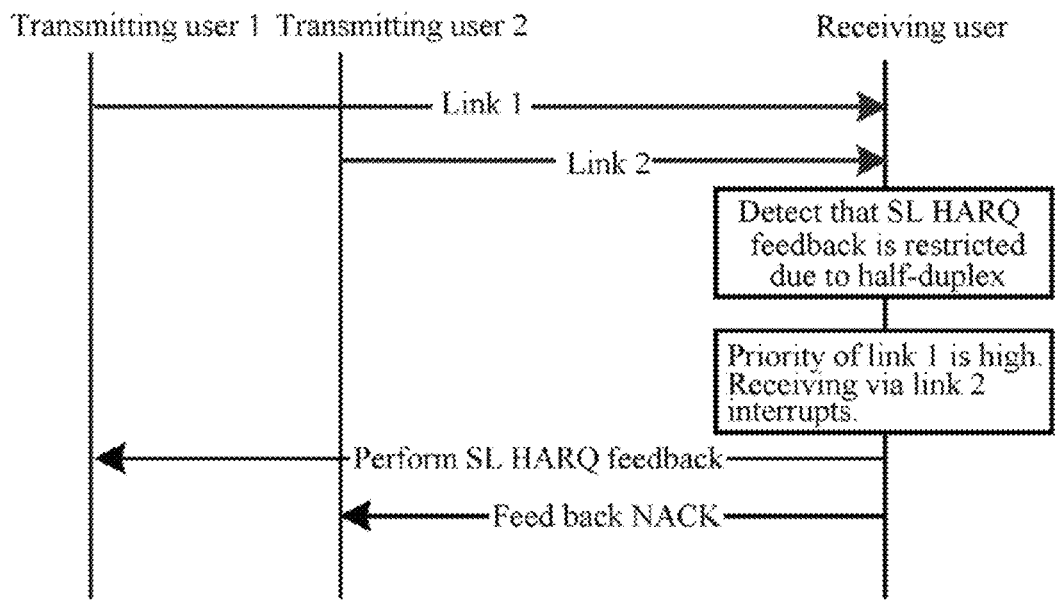
FIG. 20 is a flowchart illustrating an example of feedback processing in a case of multiple transmitting users.

As shown in FIG. 20, in a case where the receiving user detects that the SL HARQ feedback is restricted due to half-duplex, the receiving user selects the link to be preferentially processed according to the service priority or QoS (Quality of Service) level of each of link 1 and link 2.

If the priority of link 1 is higher than the priority of link 2, the receiving user preferentially performs the SL HARQ feedback for link 1 and interrupts receiving information via link 2.

In a case where link 2 supports CBG SL HARQ, if the information can still be received via link 2 after the SL HARQ feedback is completed, the receiving user continues to receive the information via link 2. After the transmission via link 2 is completed, NACK information is fed back for CBG that is not received and retransmission is requested. In a case where link 2 supports non-CBG SL HARQ, if the information can still be received via link 2 after the SL HARQ feedback is completed, the receiving user continues to receive the information via link 2. After the transmission via link 2 is completed, NACK information is fed back to transmitting user 2.

Figure 21:
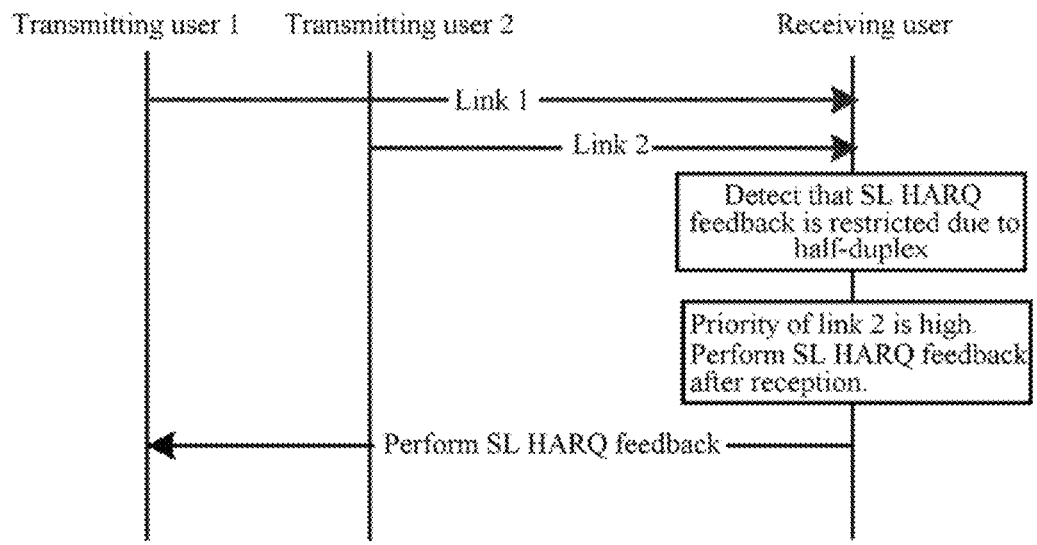
FIG. 21 is a flowchart illustrating another example of feedback processing in a case of multiple transmitting users.

On the other hand, if the priority of link 2 is higher than the priority of link 1, the receiving user preferentially receives information via link 2 rather than performing the SL HARQ feedback for link 1. After finishing receiving the information via link 2, the receiving user performs the SL HARQ feedback for link 1 according to the indication in the SCI, as shown in FIG. 21.

According to an embodiment, the feedback information may include identification information of corresponding source user equipment or may be scrambled through a codebook in order to distinguish the feedback information for multiple links from each other.

In addition, it is also possible that the feedback information includes the information on a retransmission resource for the data, and the retransmission of the data is received based on the retransmission resource.

Figure 4:
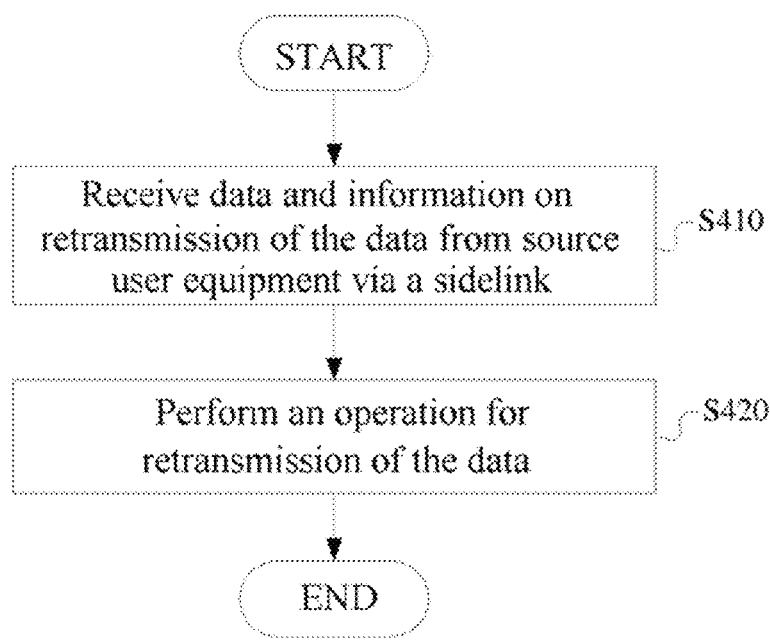
FIG. 4 is a flowchart showing a process example of a wireless communication method according to another embodiment of the present disclosure.

FIG. 4 shows an exemplary process of a corresponding wireless communication method. The method includes a step S410 of receiving data and information on retransmission of the data from source user equipment via a sidelink, and a step S420 of performing an operation for retransmission of the data.

In addition, a device and a method implemented for a base station side are further provided in the present disclosure. Next, a description of the embodiment for the device and the method implemented for a base station side is given without repeating the details corresponding to the above description of that for the user side.

Figure 5:
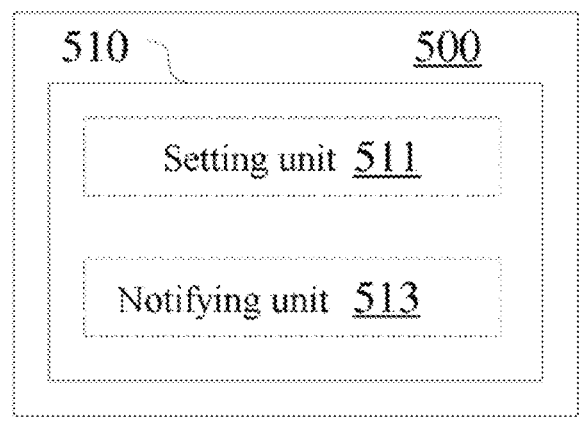
FIG. 5 is a block diagram showing a configuration example of an electronic device for wireless communication according to yet another embodiment of the present disclosure.

As shown in FIG. 5, an electronic device 500 for wireless communication according to the embodiment includes processing circuitry 510. The processing circuitry 510 includes a setting unit 511 and a notifying unit 513.

The setting unit 511 is configured to set sidelink control information. The sidelink control information is for indicating information on data retransmission performed from source user equipment to target user equipment via a sidelink. The information on data retransmission includes a time gap between initial transmission and retransmission of the data by the source user equipment or time domain position information of a feedback to the data by the target user equipment.

In other words, the set SCI format may include a SCI format for retransmission-based SL HARQ and a SCI format for feedback-based SL HARQ.

In addition, user assistance information may be set, which may include, for example, the maximum transmission block size of service transmission data, service priority information, service SL HARQ mechanism preferences, and other information.

The notifying unit 513 is configured to perform control to notify the set sidelink control information to the source user equipment.

Figure 11:
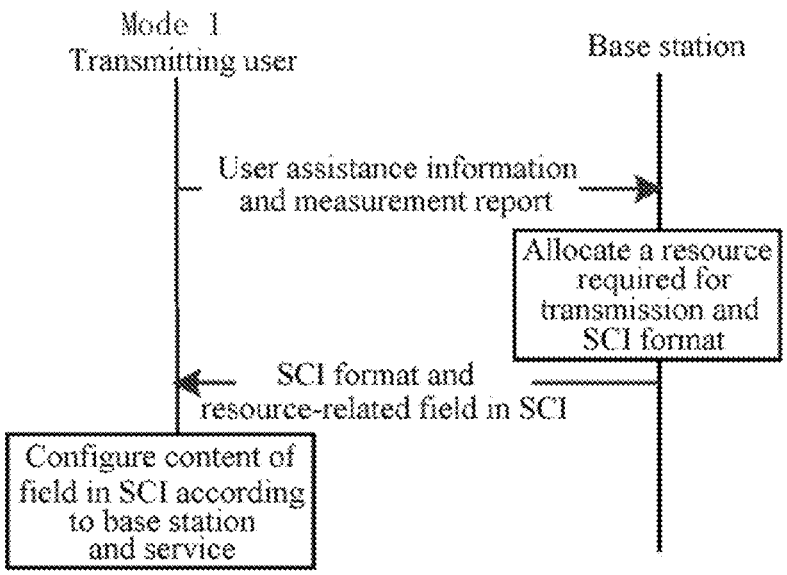
FIG. 11 is a flowchart showing an example of a configuration of sidelink control information.

More specifically, as shown in FIG. 11, for a Mode 1 user, the base station may configure the SCI format and content of a transmission resource-related field in the SCI according to the user assistance information, channel measurement, and other information reported by the user.

For the Mode 1 user, the resource-related field in the SCI may include a time gap between initial transmission and retransmission, frequency domain positions of the initial transmission and the retransmission, or time domain position of the initial transmission, frequency domain position of the initial transmission, time domain indication of SL HARQ feedback, frequency domain indication of SL HARQ feedback, and other information.

Figure 12:
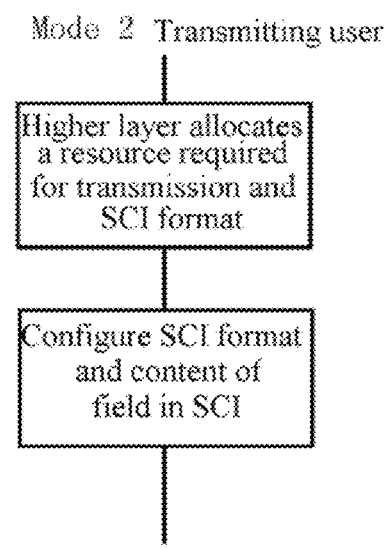
FIG. 12 is a flowchart showing another example of a configuration of sidelink control information.

In addition, as shown in FIG. 12, for a Mode 2 user, a higher layer of the user may configure the SCI format and the content of a transmission resource-related field in the SCI according to the user assistance information, channel measurement, and other information reported by the user.

Figure 6:
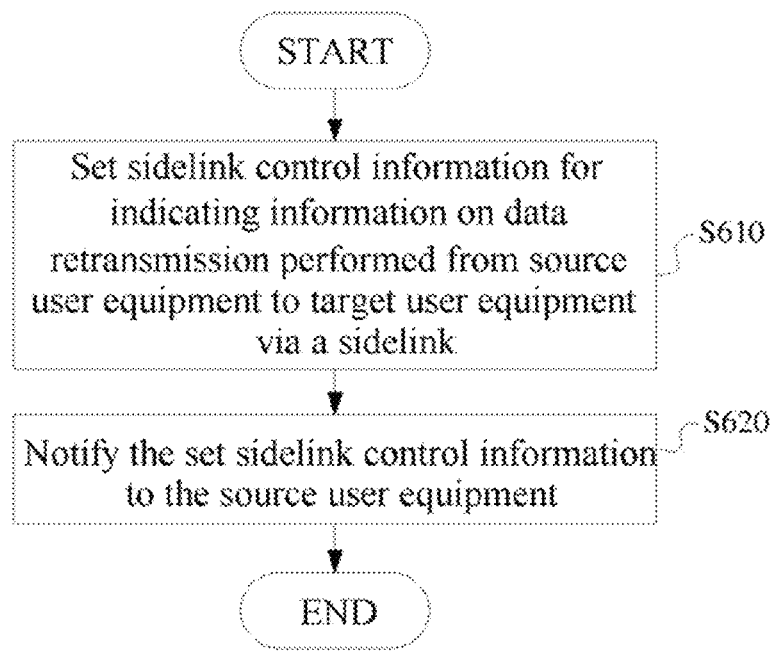
FIG. 6 is a flowchart showing a process example of a wireless communication method according to yet another embodiment of the present disclosure.

FIG. 6 shows an exemplary process of a corresponding wireless communication method. The method includes a step S610 of setting sidelink control information. The sidelink control information is for indicating information on data retransmission performed from source user equipment to target user equipment via a sidelink. The information on data retransmission may include a time gap between initial transmission and retransmission of the data by the source user equipment, or time domain position information of a feedback to the data by the target user equipment. The method further includes a step S620 of notifying the set sidelink control information to the source user equipment.

In addition, an embodiment of the present disclosure further includes a computer-readable medium, which includes executable instructions that, when executed by an information processing device, cause the information processing device to implement the above method.

The foregoing embodiment relates to a SL HARQ feedback mechanism when HARQ feedbacks are performed for multiple links based on a SL HARQ configuration and when a receiving user is restricted due to half-duplex, in order to ensure reliability of communication.

In addition, the foregoing embodiment also involves a selection of SL HARQ retransmission resources in order to ensure validity of a retransmission resource of a user.

As an example, steps of the above methods and modules and/or units of the above devices may be implemented as software, firmware, hardware or a combination thereof. In a case of implementing by software or firmware, programs constituting the software for implementing the above methods may be installed to a computer with a dedicated hardware structure (for example, a general-purpose computer 1400 shown in FIG. 7) from a storage medium or a network. The computer is capable of performing various functions when installed with various programs.

Figure 7:
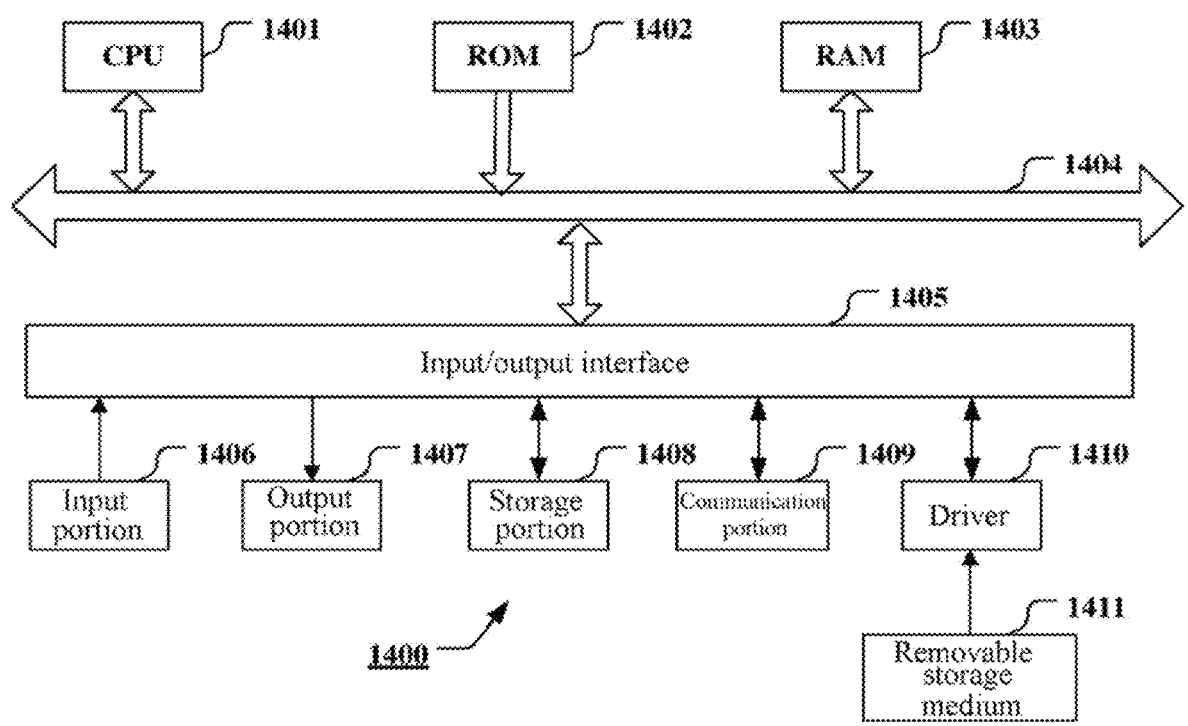
FIG. 7 is a block diagram showing an exemplary structure of a computer for implementing the method and the device according to the present disclosure.

In FIG. 7, a central processing unit (CPU) 1401 performs various processing based on programs stored in a read only memory (ROM) 1402 or programs loaded from a storage portion 1408 to a random access memory (RAM) 1403. Data required when the CPU 1401 performs various processing is also stored in the RAM 1403 as needed. The CPU 1401, the ROM 1402, and the RAM 1403 are linked to each other via a bus 1404. An input/output interface 1405 is also linked to the bus 1404.

The input/output interface 1405 is linked with an input portion 1406 (including a keyboard, a mouse and the like), an output portion 1407 (including a display, such as a Cathode Ray Tube (CRT) and a Liquid Crystal Display (LCD), and a loudspeaker), a storage portion 1408 (including a hard disk and the like), and a communication portion 1409 (including a network interface card, such as a LAN card, a modem and the like). The communication portion 1409 performs communication processing via a network such as the Internet. A driver 1410 may also be linked to the input/output interface 1405 as needed. A removable medium 1411 such as a magnetic disk, an optical disk, a magneto-optical disk, and a semiconductor memory is mounted on the driver 1410 as needed, so that a computer program read from the removable medium is installed into the storage portion 1408 as needed.

In a case where the above series of processing are implemented by software, programs forming the software are installed from a network such as the Internet or a storage medium such as the removable medium 1411.

Those skilled in the art should understand that the storage medium is not limited to the removable medium 1411 shown in FIG. 7 that stores a program and is distributed separately from a device so as to provide the program to the user. Examples of the removable medium 1411 include: a magnetic disk (including a floppy disk (registered trademark)), an optical disk (including a compact disk read only memory (CD-ROM) and a digital versatile disk (DVD)), a magneto-optical disk (including a mini disk (MD) (registered trademark)), and a semiconductor memory. Alternatively, the storage medium may be the ROM 1402, a hard disk included in the storage portion 1408 or the like. The storage medium has a program stored therein and is distributed to the user together with a device in which the storage medium is included.

A program product storing machine readable instruction codes is further provided according to an embodiment of the present disclosure. The instruction codes, when being read and executed by a machine, may perform the methods according to the above embodiments of the present disclosure.

Accordingly, a storage medium for carrying the program product storing the machine-readable instruction codes is also provided according to the present disclosure. The storage medium may include, but not limited to, a floppy disk, an optical disk, a magneto-optical disk, a memory card, a memory stick and the like.

The following electronic device is further involved in the embodiments of the present disclosure. In a case where the electronic device is used for a base station side, the electronic device may be implemented as any type of gNB or evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base station, such as a NodeB and a base transceiver station (BTS). The electronic device may include: a body configured to control wireless communications (which is also referred to as a base station equipment); and one or more remote radio heads (RRH) located at a different position from the body. In addition, various types of terminals, which are described below, may each serve as a base station by performing functions of the base station temporarily or semi-persistently.

In a case where the electronic device is used for a user equipment side, the electronic device may be implemented as a mobile terminal (such as a smartphone, a tablet personal computer (PC), a notebook PC, a portable game terminal, a portable/dongle mobile router and a digital camera) or a vehicle terminal (such as an a vehicle navigation device). Furthermore, the electronic device may be a wireless communication module (such as an integrated circuitry module including a single or multiple dies) mounted on each of the terminals described above.

[Application Example for a Terminal Equipment]

Figure 8:
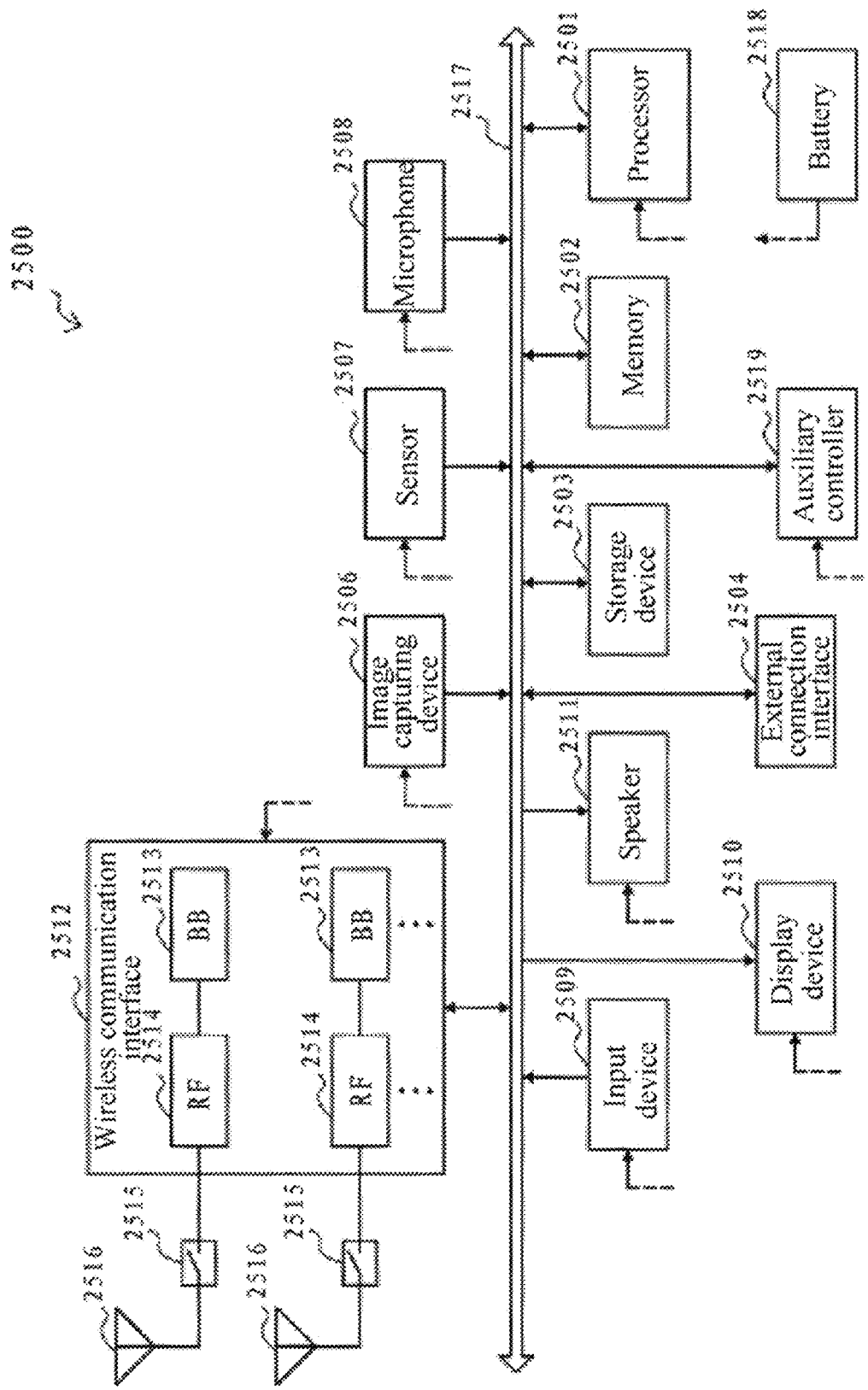
FIG. 8 is a block diagram showing a schematic configuration of a smart phone to which the technology according to the present disclosure may be applied.

FIG. 8 is a block diagram showing an exemplary configuration of a smartphone 2500 to which the technology according to the present disclosure may be applied. The smartphone 2500 includes a processor 2501, a memory 2502, a storage device 2503, an external connection interface 2504, an image capturing device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and control functions of an application layer and additional layer of the smartphone 2500. The memory 2502 includes an RAM and an ROM, and stores a program that is executed by the processor 2501 and data. The storage 2503 may include a storage medium such as a semiconductor memory and a hard disk. The external connection interface 2504 is an interface for connecting an external device (such as a memory card and a Universal Serial Bus (USB) device) to the smartphone 2500.

The image capturing device 2506 includes an image sensor (such as a charge coupled device (CCD) and a complementary metal oxide semiconductor (CMOS)), and generates a captured image. The sensor 2507 may include a group of sensors, such as a measurement sensor, a gyro sensor, a geomagnetic sensor and an acceleration sensor. The microphone 2508 converts sound inputted to the smartphone 2500 into an audio signal. The input device 2509 includes, for example, a touch sensor configured to detect touch onto a screen of the display device 2510, a keypad, a keyboard, a button, or a switch, and receives an operation or information inputted by a user. The display device 2510 includes a screen such as a liquid crystal display (LCD) and an organic light-emitting diode (OLED) display, and displays an output image of the smartphone 2500. The speaker 2511 is configured to convert an audio signal outputted from the smartphone 2500 into sound.

The wireless communication interface 2512 supports any cellular communication scheme such as LTE and LTE-Advanced, and performs wireless communication. The wireless communication interface 2512 may generally include, for example, a baseband (BB) processor 2513 and a radio frequency (RF) circuit 2514. The BB processor 2513 may perform, for example, encoding/decoding, modulation/demodulation, and multiplexing/demultiplexing, and perform various types of signal processing for wireless communication. The RF circuit 2514 may include, for example, a mixer, a filter and an amplifier, and transmits and receives a wireless signal via the antenna 2516. The wireless communication interface 2512 may be a chip module having a BB processor 2513 and an RF circuit 2514 integrated thereon. The wireless communication interface 2512 may include multiple BB processors 2513 and multiple RF circuits 2514, as shown in FIG. 8. Although an example in which the wireless communication interface 2512 includes multiple BB processors 2513 and multiple RF circuits 2514 is shown in FIG. 8, the wireless communication interface 2512 may include a single BB processor 2513 and a single RF circuit 2514.

Furthermore, in addition to a cellular communication scheme, the wireless communication interface 2512 may support another type of wireless communication scheme such as a short-range wireless communication scheme, a near field communication scheme, and a wireless local area network LAN scheme. In this case, the wireless communication interface 2512 may include a BB processor 2513 and an RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive a wireless signal. As shown in FIG. 8, the smartphone 2500 may include multiple antennas 2516. Although FIG. 8 shows an example in which the smartphone 2500 includes multiple antennas 2516, the smartphone 2500 may include a single antenna 2516.

In addition, the smartphone 2500 may include an antenna 2516 for each wireless communication scheme. In this case, the antenna switch 2515 may be omitted from the configuration of the smartphone 2500.

The processor 2501, the memory 2502, the storage device 2503, the external connection interface 2504, the image capturing device 2506, the sensor 2507, the microphone 2508, the input device 2509, the display device 2510, the speaker 2511, the wireless communication interface 2512, and the auxiliary controller 2519 are connected to each other via the bus 2517. The battery 2518 supplies power to the respective blocks of the smartphone 2500 as shown in FIG. 8 via feeder lines which are partially shown as dashed lines in the figure. The auxiliary controller 2519 manipulates a minimum necessary function of the smartphone 2500 in a sleep mode, for example.

In the smartphone 2500 shown in FIG. 8, the transceiver device of the wireless communication device at the user equipment side according to the embodiment of the present disclosure may be implemented by the wireless communication interface 2512. At least a part of the functions of the processing circuitry and/or respective units of the electronic device or the wireless communication device at the user equipment side according to the embodiment of the present disclosure may also be implemented by the processor 2501 or the auxiliary controller 2519. For example, a part of the function of the processor 2501 may be implemented by the auxiliary controller 2519 so as to reduce power consumption of the battery 2518. Further, the processor 2501 or the auxiliary controller 2519 may perform at least a part of the functions of the processing circuitry and/or respective units of the electronic device or wireless communication device at user equipment side according to the embodiment of the present disclosure by executing the program stored in the memory 2502 or the storage device 2503.

[Exemplary Application Regarding a Base Station]

Figure 9:
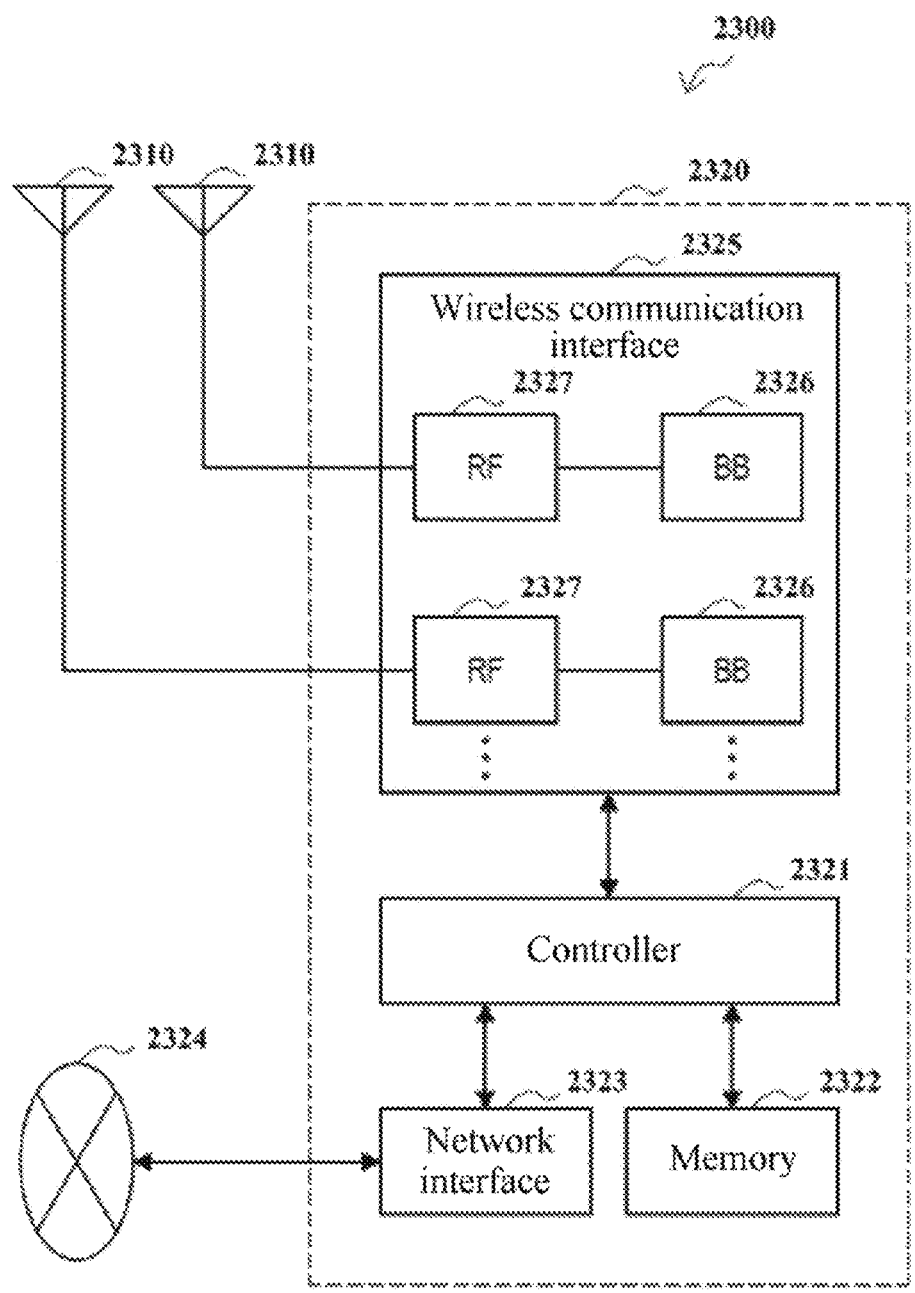
FIG. 9 is a block diagram showing an example of a schematic configuration of a gNB to which the technology according to the present disclosure may be applied.

FIG. 9 is a block diagram showing an exemplary configuration of a gNB to which the technology according to the present disclosure may be applied. A gNB 2300 includes one or more antennas 2310 and a base station equipment 2320. The base station equipment 2320 and each of the antenna 2310 may be connected with each other via a radio frequency (RF) cable.

Each of the antennas 2310 includes a single or multiple antenna elements (such as multiple antenna elements included in a Multi-Input Multi-Output (MIMO) antenna), and is configured for the base station equipment 2320 to transmit and receive a wireless signal. As shown in FIG. 9, the gNB 2300 may include multiple antennas 2310. For example, the multiple antennas 2310 may be compatible with multiple frequency bands used by the gNB 2300. Although FIG. 9 shows an example in which the gNB 2300 includes multiple antennas 2310, the gNB 2300 may include a single antenna 2310.

The base station equipment 2320 includes a controller 2321, a memory 2322, a network interface 2323, and a wireless communication interface 2325.

The controller 2321 may be, for example, a CPU or a DSP, and operate various functions of a higher layer of the base station equipment 2320. For example, the controller 2321 generates a data packet based on data in a signal processed by the wireless communication interface 2325, and transmits the generated packet via the network interface 2323. The controller 2321 may bundle data from multiple baseband processors to generate a bundled packet and transmit the generated bundled packet. The controller 2321 may have a logical function of performing control such as radio resource control, radio bearer control, mobility management, admission control, and scheduling. The control may be performed in corporation with a nearby gNB or core network node. The memory 2322 includes an RAM and an ROM, and stores a program executed by the controller 2321 and various types of control data (such as a terminal list, transmission power data and scheduling data).

The network interface 2323 is a communication interface for connecting the base station equipment 2320 to a core network 2324. The controller 2321 may communicate with the core network node or another gNB via the network interface 2323. In this case, the gNB 2300 may be connected with the core network node or another gNB via a logic interface (such as an SI interface and an X2 interface). The network interface 2323 may also be a wired communication interface or a wireless communication interface for a wireless backhaul. In a case where the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides wireless connection to a terminal located in a cell of the gNB 2300 via the antenna 2310. The wireless communication interface 2325 may generally include a BB processor 2326 and an RF circuit 2327. The BB processor 2326 may perform for example coding/decoding, modulation/demodulation and multiplexing/demultiplexing, and execute various types of signal processing of a layer (for example L1, Medium Access Control (MAC), Radio Link Control (RLC) and Packet Data Convergence Protocol (PDCP)). Instead of the controller 2321, the BB processor 2326 may have a part or all of the above-mentioned logic functions. The BB processor 2326 may be a memory storing communication control programs, or a module including a processor which is configured to execute the programs and a related circuit. Update of the programs may change the function of the BB processor 2326. The module may be a card or blade inserted into a slot of the base station equipment 2320. Alternatively, the module may be a chip mounted on a card or blade. The RF circuit 2327 may include, for example, a mixer, a filter and an amplifier, and transmits and receives a wireless signal via the antenna 2310.

As shown in FIG. 9, the wireless communication interface 2325 may include multiple BB processors 2326. For example, the multiple BB processors 2326 may be compatible with multiple frequency bands used by the gNB 2300. As shown in FIG. 9, the wireless communication interface 2325 may include multiple RF circuits 2327. For example, the multiple RF circuits 2327 may be compatible with multiple antenna elements. Although an example in which the wireless communication interface 2325 includes multiple BB processors 2326 and multiple RF circuits 2327 is shown in FIG. 9, the wireless communication interface 2325 may include a single BB processor 2326 and a single RF circuit 2327.

In the gNB 2300 shown in FIG. 9, the transceiver device of the wireless communication device at the base station side according to the embodiment of the present disclosure may be implemented by the wireless communication interface 2325. At least a part of the functions of the processing circuitry and/or respective units of the electronic device or the wireless communication device at the base station side according to the embodiment of the present disclosure may also be implemented by the controller 2321. For example, the controller 2321 may perform at least a part of the functions of the processing circuitry and/or respective units of the electronic device or the wireless communication device at base station side according to the embodiment of the present disclosure by executing the program stored in the memory 2322.

[Exemplary Application in a Vehicle Navigation Device]

Figure 10:
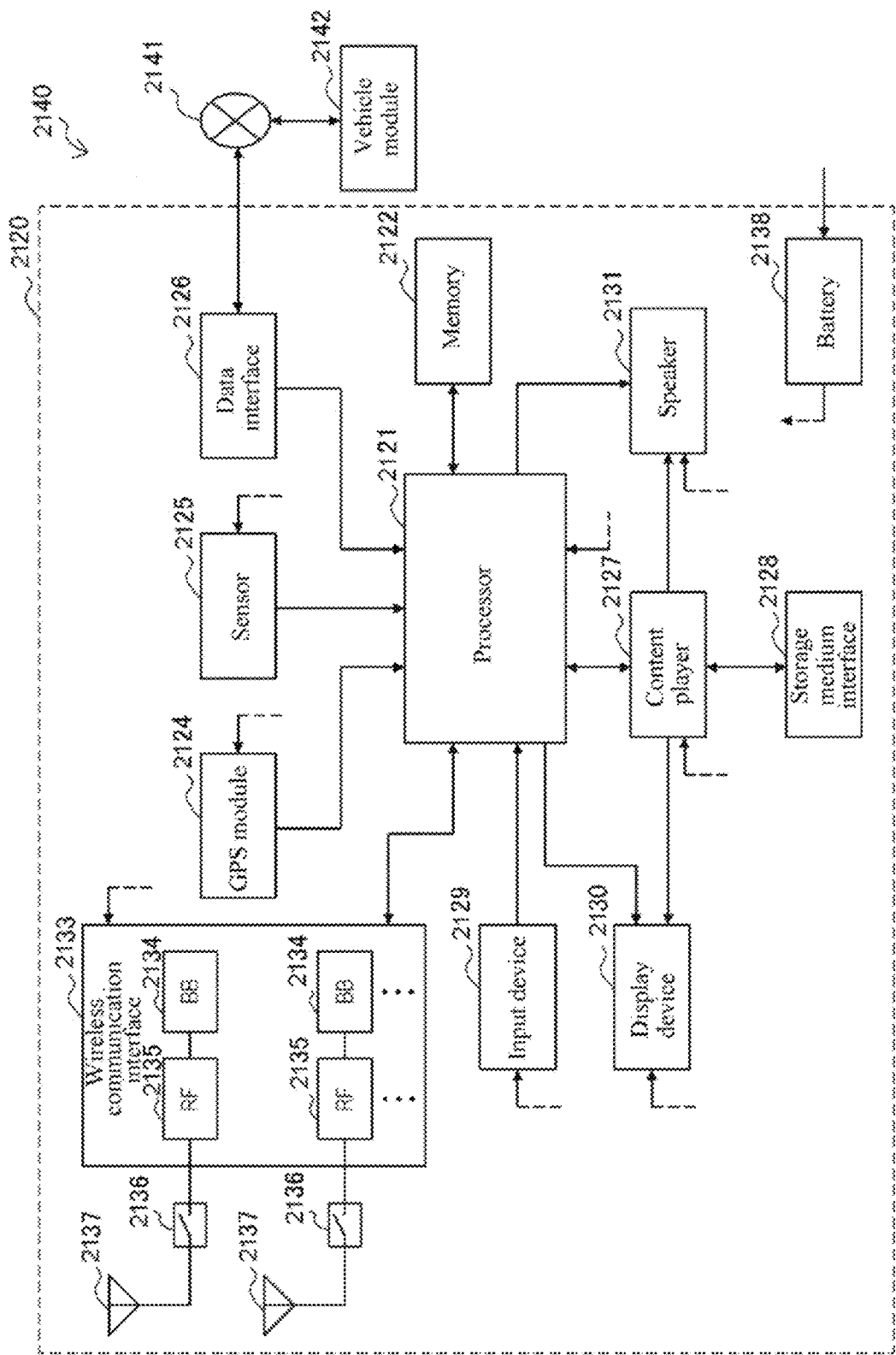
FIG. 10 is a block diagram showing an example of a schematic configuration of a car navigation device to which the technology of the present disclosure may be applied.

FIG. 10 is a block diagram showing an exemplary configuration of a vehicle navigation equipment 2120 to which the technology according to the present disclosure may be applied. The vehicle navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or a SoC, and control a navigation function and another function of the vehicle navigation device 2120. The memory 2122 includes an RAM and an ROM, and stores a program that is executed by the processor 2121 and data.

The GPS module 2124 uses a GPS signal received from a GPS satellite to measure a position (such as a latitude, a longitude, and an altitude) of the vehicle navigation device 2120. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data generated by the vehicle (such as vehicle speed data).

The content player 2127 reproduces content stored in a storage medium (such as a CD and a DVD) inserted into the storage medium interface 2128. The input device 2129 includes, for example, a touch sensor configured to detect touch on a screen of the display device 2130, a button, or a switch, and receives an operation or information inputted by a user. The display device 2130 includes a screen such as a LCD or an OLED display, and displays an image of the navigation function or content that is reproduced. The speaker 2131 outputs a sound of the navigation function or content that is reproduced.

The wireless communication interface 2133 supports any cellular communication scheme such as LTE and LTE-Advanced, and performs wireless communication. The wireless communication interface 2133 may generally include a BB processor 2134 and an RF circuit 2135. The BB processor 2134 may perform, for example, encoding/decoding, modulation/demodulation, and multiplexing/demultiplexing, and perform various types of signal processing for wireless communication. The RF circuit 2135 may include, for example, a mixer, a filter and an amplifier, and transmits and receives a wireless signal via the antenna 2137. The wireless communication interface 2133 may be a chip module having a BB processor 2134 and an RF circuit 2135 integrated thereon. The wireless communication interface 2133 may include multiple BB processors 2134 and multiple RF circuits 2135, as shown in FIG. 10. Although an example in which the wireless communication interface 2133 includes multiple BB processors 2134 and multiple RF circuits 2135 is shown in FIG. 10, the wireless communication interface 2133 may include a single BB processor 2134 and a single RF circuit 2135.

Furthermore, in addition to a cellular communication scheme, the wireless communication interface 2133 may support another type of wireless communication scheme such as a short-range wireless communication scheme, a near field communication scheme, and a wireless LAN scheme. In this case, the wireless communication interface 2133 may include a BB processor 2134 and an RF circuit 2135 for each wireless communication scheme.

Each of the antenna switches 2136 switches connection destinations of the antennas 2137 among multiple circuits (such as circuits for different wireless communication schemes) included in the wireless communication interface 2133.

Each of the antennas 2137 includes a single or multiple antenna elements (such as multiple antenna elements included in an MIMO antenna), and is used for the wireless communication interface 2133 to transmit and receive a wireless signal. As shown in FIG. 10, the vehicle navigation device 2120 may include multiple antennas 2137. Although FIG. 10 illustrates an example in which the vehicle navigation device 2120 includes multiple antennas 2137, the vehicle navigation device 2120 may include a single antenna 2137.

In addition, the vehicle navigation device 2120 may include an antenna 2137 for each wireless communication scheme. In this case, the antenna switches 2136 may be omitted from the configuration of the vehicle navigation device 2120.

The battery 2138 supplies power to the respective blocks of the vehicle navigation device 2120 shown in FIG. 10 via feeder lines that are partially shown as dashed lines in the Figure. The battery 2138 accumulates power supplied from a vehicle.

In the vehicle navigation device 2120 shown in FIG. 10, the transceiver device or the transceiver unit of the wireless communication device according to the embodiment of the present disclosure may be implemented by the wireless communication interface 2133. At least a part of the functions of the processing circuitry and/or respective units of the electronic device or the wireless communication device according to the embodiment of the present disclosure may also be implemented by the processor 2121.

The technology of the present disclosure may also be implemented as an in-vehicle system (or a vehicle) 2140 including one or more of the vehicle navigation device 2120, an in-vehicle network 2141 and a vehicle module 2142. The vehicle module 2142 generates vehicle data (such as a vehicle speed, an engine speed, and fault information), and outputs the generated data to the in-vehicle network 2141.

In the above description of specific embodiments of the present disclosure, features described and/or illustrated for one embodiment may be used in one or more other embodiments in the same or similar manner, or may be combined with features in other embodiments, or may replace features in other embodiments.

It is be noted that, terms "including/comprising" used herein refer to existing of features, elements, steps or components, but existing or adding of one or more other features, elements, steps or components is not excluded.

In the above embodiments and examples, reference numerals consist of numbers are used to represent steps and/or units. Those skilled in the art should understand that the reference numerals are used to facilitate describing and drawing, and are not intended to indicate an order or limitation in any way.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is disclosed by the description of specific embodiments of the present disclosure above, it should be understood that all the embodiments and examples described above are only exemplary and are not intended to limit. Various modifications, improvements and equivalents may be made to the present disclosure by those skilled in the art within the scope and spirit of the attached claims. These modifications, improvements or equivalents shall also fall within the protection scope of the present disclosure.

In addition, the following solutions are further provided according to embodiments of present disclosure.

(1) An electronic device for wireless communication, comprising processing circuitry configured to:
 perform control to transmit data and information on retransmission of the data to target user equipment via a sidelink; and
 control an operation for retransmission of the data.

(2) The electronic device according to (1), wherein
 the information comprises a time gap between initial transmission and retransmission of the data; and
 the operation comprises performing retransmission of the data according to the time gap.

(3) The electronic device according to (1), wherein
 the information comprises time domain position information of a feedback to the data; and
 the operation comprises receiving feedback information of the target user equipment to the data based on the time domain position information, and performing retransmission of the data based on the feedback information.

(4) The electronic device according to (3), wherein the information further comprises information indicating a retransmission unit; and
 the operation comprises receiving a feedback to the data and performing retransmission of the data in units of transmission block or code block group.

(5) The electronic device according to (3), wherein the time domain position information comprises:
 one or more time domain positions for receiving the feedback information; and/or
 one or more time windows for receiving the feedback information.

(6) The electronic device according to (5), wherein the time domain position information comprises a plurality of time domain positions for receiving the feedback information, and the operation comprises:
 receiving the feedback information successively at the plurality of time domain positions until the feedback information is received; and
 performing retransmission if the feedback information is not received at any of the plurality of time domain positions.

(7) The electronic device according to (5), wherein the time domain position information comprises a plurality of time windows for receiving the feedback information, and the operation comprises:
 receiving the feedback information successively in the plurality of time windows until the feedback information is received; and
 performing retransmission if the feedback information is not received in any of the plurality of time windows.

(8) The electronic device according to (5), wherein the time domain position information comprises the time domain positions and the time windows for receiving the feedback information, and the operation comprises:
 receiving the feedback information successively at the time domain positions and in the time windows until the feedback information is received; and performing retransmission if the feedback information is not received at any of the time domain positions or in any of the time windows.

(9) The electronic device according to (1), wherein the information comprises one or more of:
resource reservation, source user equipment identification, target user equipment identification, frequency domain position(s) for initial transmission and retransmission, frequency domain position(s) for initial transmission and feedback transmission, modulation and coding scheme, retransmission index, code block group transmission information, and service priority of the data.

(10) The electronic device according to (3), wherein the operation further comprises:
decoding the received feedback information; and
determining whether the decoded feedback information is for the data.

(11) The electronic device according to (4), wherein the operation comprises performing feedback to the data and retransmission of the data in units of code block group, and the feedback information comprises codebook information.

(12) The electronic device according to (3), wherein the feedback information comprises information on retransmission resources for the data; and
the operation further comprises determining retransmission resources for the data according to the information on retransmission resources.

(13) A wireless communication method, comprising:
transmitting data and information on retransmission of the data to target user equipment via a sidelink; and
performing an operation for retransmission of the data.

(14) An electronic device for wireless communication, comprising processing circuitry configured to:
perform control to receive data and information on retransmission of the data from source user equipment via a sidelink; and
control an operation for retransmission of the data.

(15) The electronic device according to (14), wherein the information comprises a time gap between initial transmission and retransmission of the data; and
the operation comprises receiving retransmission of the data according to the time gap.

(16) The electronic device according to (14), wherein the information comprises time domain position information of a feedback to the data; and
the operation comprises transmitting the feedback information to the data to the source user equipment based on the time domain position information.

(17) The electronic device according to (16), wherein the information further comprises information indicating a retransmission unit; and
the operation comprises performing the feedback to the data in units of transmission block or code block group.

(18) The electronic device according to (16), wherein the time domain position information comprises one or more time domain positions for transmitting the feedback information and/or one or more time windows for transmitting the feedback information; and
the operation comprises transmitting the feedback information at one of the one or more time domain positions or in one of the one or more time windows.

(19) The electronic device according to (16), wherein the information comprises a service priority of the data; and
the operation comprises:
transmitting the feedback information and receiving other data based on the service priority; and/or
transmitting the feedback information for a plurality of links based on the service priority.

(20) The electronic device according to (19), wherein the operation further comprises:
selecting, according to the priority, a link for which the feedback information is to be transmitted, in a case where the number of the plurality of links exceeds a predetermined threshold.

(21) The electronic device according to (19), wherein the operation further comprises distinguishing the feedback information for the plurality of links from each other by:
comprising identification information of corresponding source user equipment in the feedback information; and/or
scrambling the feedback information with a codebook.

(22) The electronic device according to (16), wherein the operation further comprises:
comprising information on a retransmission resource for the data in the feedback information, and
receiving retransmission of the data based on the retransmission resource.

(23) A wireless communication method, comprising:
receiving data and information on retransmission of the data from source user equipment via a sidelink; and
performing an operation for retransmission of the data.

(24) An electronic device for wireless communication, comprising processing circuitry configured to:
set sidelink control information for indicating information on data retransmission performed from source user equipment to target user equipment via a sidelink; and
perform control to notify the set sidelink information to the source user equipment,
wherein the information on data retransmission comprises a time gap between initial transmission and retransmission of the data by the source user equipment, or time domain position information of a feedback to the data by the target user equipment.

(25) A wireless communication method, comprising:
setting sidelink control information for indicating information on data retransmission performed from source user equipment to target user equipment via a sidelink; and
notifying the set sidelink control information to the source user equipment,
wherein the information on data retransmission comprises a time gap between initial transmission and retransmission of the data by the source user equipment, or time domain position information of a feedback to the data by the target user equipment.

(26) A computer readable medium comprising executable instructions that, when executed by an information processing apparatus, cause the information processing apparatus to implement the method according to any one of (13), (23) and (25).

The invention claimed is:
1. An electronic device in a wireless communication system, the electronic device comprising processing circuitry configured to:
transmit data to a target user equipment via a sidelink;
transmit information on a retransmission of the data to the target user equipment,
wherein the information on the retransmission of the data indicates time and frequency resources for receiving feedback information relating to feedback of the data,
wherein the time and frequency resources include a first time in a first time slot and a second time in a second time slot sequential to the first time slot, and wherein the first time is one of a time domain position or a time window within the first time slot, and the second time is one of a time domain position or a time window within the second time slot;
receive the feedback information in the time and frequency resources of the first and second time slots; and
perform a retransmission of the data based on the feedback information.

2. The electronic device according to claim 1, wherein the information on the retransmission of the data further comprises a time gap between an initial transmission of the data and the retransmission of the data; and
the circuitry is further configured to perform the retransmission of the data according to the time gap.

3. The electronic device according to claim 1, wherein the information on the retransmission of the data includes information indicating a retransmission unit; and
the circuitry is further configured to receive the feedback information and perform the retransmission of the data in units of a transmission block (TB) or a code block group (CBG) based on the information indicating the retransmission unit.

4. The electronic device according to claim 1, wherein the information on the retransmission of the data further comprises one or more of:
a resource reservation, a source user equipment identification, a target user equipment identification, a frequency domain position for an initial transmission and the retransmission of the data, a frequency domain position for the initial transmission and a transmission of the feedback information, a modulation and coding scheme, a retransmission index, code block group (CBG) transmission information, or a service priority of the data.

5. The electronic device according to claim 1, wherein the circuitry is further configured to:
perform the retransmission of the data only in a case that the feedback information comprises NACK information and not in a case that the feedback information comprises ACK information or no feedback information.

6. The electronic device according to claim 1,
wherein the information on the retransmission of the data includes information indicating a retransmission unit,
wherein the circuitry is further configured to receive the feedback information and determine whether the information indicating a retransmission unit indicates that the retransmission of the data is to be in units of a transmission block (TB) or in units of a code block group (CBG),
upon determining that the retransmission of the data is to be in units of the TB, perform the retransmission of the data of a specific TB corresponding to a HARQ NACK, and
upon determining that the retransmission of the data is to be in units of the CBG, receive information about a feedback codebook and perform the retransmission of the data of a CBG upon determining, via the feedback codebook, that feedback for the CBG is NACK.

7. The electronic device according to claim 1, wherein the feedback information indicates information on retransmission resources for data; and
the circuitry is further configured to:
perform the retransmission of the data by utilizing the retransmission resources.

8. The electronic device according to claim 1,
wherein the first time is the time domain position within the first time slot, and the second time is the time window within the second time slot, or
wherein the first time is the time window within the first time slot, and the second time is the time domain position within the second time slot.

9. An electronic device in a wireless communication system, the electronic device comprising processing circuitry configured to:
receive data from a source user equipment via a sidelink;
receive information on a retransmission of the data from the source user equipment;
wherein the information on the retransmission of the data indicates time and frequency resources for transmitting feedback information relating to feedback of the data,
wherein the time and frequency resources include a first time in a first time slot and a second time in a second time slot sequential to the first time slot, and
wherein the first time is one of a time domain position or a time window within the first time slot, and the second time is one of a time domain position or a time window within the second time slot;
transmit the feedback information multiple times in the time and frequency resources of the first and second time slots; and
receive a retransmission of the data based on the feedback information.

10. The electronic device according to claim 9, wherein the information on the retransmission of the data further comprises a time gap between an initial transmission of the data and the retransmission of the data; and
the circuitry is further configured to receive the retransmission of the data according to the time gap.

11. The electronic device according to claim 9, wherein the information on the retransmission of the data includes information indicating a retransmission unit; and
the circuitry is further configured to transmit the feedback information and receive the retransmission of the data in units of a transmission block (TB) or a code block group (CBG) based on the information indicating the retransmission unit.

12. The electronic device according to claim 9, wherein the information on the retransmission of the data further comprises a service priority of the data; and
the circuitry is further configured to:
transmit the feedback information and receive other data based on the service priority; or
transmit the feedback information for a plurality of links based on the service priority.

13. The electronic device according to claim 12, wherein the circuitry is further configured to:
select according to the service priority, a link for which the feedback information is to be transmitted, in a case where a number of the plurality of links exceeds a predetermined threshold.

14. The electronic device according to claim 9, wherein the circuitry is further configured to:
distinguish the feedback information for the plurality of links from each other by at least one of:
including identification information of a corresponding source user equipment in the feedback information; or
scrambling the feedback information with a scrambling codebook.

15. The electronic device according to claim 9, wherein the feedback information indicates information on retransmission resources for the data; and the circuitry is further configured to:
receive the retransmission of the data by utilizing the retransmission resources.

16. The electronic device according to claim 9,
wherein the first time is the time domain position within the first time slot, and the second time is the time window within the second time slot, or
wherein the first time is the time window within the first time slot, and the second time is the time domain position within the second time slot.

17. A method performed by a wireless communication device, the method comprising:
transmitting data to a target user equipment via a sidelink;
transmitting information on a retransmission of the data to the target user equipment,
wherein the information on the retransmission of the data indicates time and frequency resources for receiving feedback information relating to feedback of the data,
wherein the time and frequency resources include a first time in a first time slot and a second time in a second time slot sequential to the first time slot, and
wherein the first time is one of a time domain position or a time window within the first time slot, and the second time is one of a time domain position or a time window within the second time slot;
receiving the feedback information multiple times in the time and frequency resources of the first and second time slots; and
performing a retransmission of the data based on the feedback information.

18. The method according to claim 17, wherein
the information on the retransmission of the data further comprises a time gap between an initial transmission of the data and the retransmission of the data; and
the method further comprising:
performing the retransmission of the data according to the time gap.

19. The method according to claim 17, wherein
the information on the retransmission of the data includes information indicating a retransmission unit; and
the method further comprising:
receiving the feedback information and performing the retransmission of the data in units of a transmission block (TB) or a code block group (CBG) based on the information indicating the retransmission unit.

20. The method according to claim 17,
wherein the information on the retransmission of the data includes information indicating a retransmission unit,
wherein the method further comprises:
receiving the feedback information and determining whether the information indicating a retransmission unit indicates that the retransmission of the data is to be in units of a transmission block (TB) or in units of a code block group (CBG),
upon determining that the retransmission of the data is to be in units of the TB, performing the retransmission of the data of a specific TB corresponding to a HARQ NACK, and
upon determining that the retransmission of the data is to be in units of the CBG, receiving information about a feedback codebook and performing the retransmission of the data of a CBG upon determining, via the feedback codebook, that feedback for the CBG is NACK.

21. The method according to claim 17, further comprising:
performing the retransmission of the data only in a case that the feedback information comprises NACK information and not in a case that the feedback information comprises ACK information or no feedback information is received.

22. The method according to claim 17, wherein
the feedback information indicates information on retransmission resources for data; and
the method further comprises:
performing the retransmission of the data by utilizing the retransmission resources.

23. The method according to claim 17,
wherein the first time is the time domain position within the first time slot, and the second time is the time window within the second time slot, or
wherein the first time is the time window within the first time slot, and the second time is the time domain position within the second time slot.

* * * * *